(12) United States Patent
Zhou et al.

(10) Patent No.: US 11,715,834 B2
(45) Date of Patent: Aug. 1, 2023

(54) FUEL CELL CATHODE CATALYST (71) Applicant: Toyota Motor Engineering and Manufacturing North America, Inc., Erlanger, KY (US)

(72) Inventors: Li Qin Zhou, Okemos, MI (US); Kan Huang, Farmington Hills, MI (US); Hongfei Jia, Ann Arbor, MI (US); Xiaochen Shen, Akron, OH (US); Zhenmeng Peng, Hudson, OH (US); Hisao Kato, Aichi (JP)

(73) Assignees: Toyota Motor Engineering and Manufacturing North America, Inc., Plano, TX (US); The University of Akron, Akron, OH (US)

( * ) Notice: Subject to any disclaimer, the term of this patent is extended or adjusted under 35 U.S.C. 154(b) by 359 days.

(21) Appl. No.: 16/728,619

(22) Filed: Dec. 27, 2019

(65) Prior Publication Data
US 2021/0202957 A1 Jul. 1, 2021

(51) Int. Cl.
| | |
|---|---|
| *B01J 21/18* | (2006.01) |
| *B01J 23/42* | (2006.01) |
| *B01J 23/72* | (2006.01) |
| *B01J 23/755* | (2006.01) |
| *B01J 23/89* | (2006.01) |
| *B01J 37/02* | (2006.01) |
| *B01J 37/08* | (2006.01) |

(Continued)

(52) U.S. Cl.
CPC .... *H01M 4/926* (2013.01); *H01M 2004/8689* (2013.01)

(58) Field of Classification Search
CPC . B01J 23/42; B01J 23/72; B01J 23/755; B01J 23/8906; B01J 23/892; B01J 23/8926; B01J 21/18; B01J 37/0201; B01J 37/0207; B01J 37/0217; B01J 37/08; H01M 4/926
See application file for complete search history.

(56) References Cited

U.S. PATENT DOCUMENTS

| | | | | |
|---|---|---|---|---|
| 7,132,385 B2* | 11/2006 | Pak | ........................ | B82Y 30/00 502/185 |
| 7,566,514 B2* | 7/2009 | Lee | ........................ | H01M 4/926 204/283 |
| 7,585,808 B2 | 9/2009 | Malek et al. | | |

(Continued)

OTHER PUBLICATIONS

Zhang, C., et al., "Octahedral Pt2CuNi Uniform Alloy Nanoparticle Catalysts with High Activity and Promising Stability for Oxygen Reduction Reaction", ACS Catal. 2015, 5, 2296-2300.

(Continued)

*Primary Examiner* — Cam N. Nguyen
(74) *Attorney, Agent, or Firm* — Jordan IP Law, LLC (57) ABSTRACT

A fuel cell catalyst for oxygen reduction reactions including Pt—Ni—Cu nanoparticles supported on nitrogen-doped mesoporous carbon (MPC) having enhanced activity and durability, and method of making said catalyst. The catalyst is synthesized by employing a solid state chemistry method, which involves thermally pretreating a N-doped MPC to remove moisture from the surface; impregnation of metal precursors on the N-doped MPC under vacuum condition; and reducing the metal precursors in a stream of CO and $H_2$ gas mixture.

10 Claims, 4 Drawing Sheets

(51) Int. Cl.
*H01M 4/92* (2006.01)
*H01M 4/86* (2006.01)

(56) References Cited

U.S. PATENT DOCUMENTS

| | | | | |
|---|---|---|---|---|
| 7,662,740 | B2* | 2/2010 | Chondroudis | H01M 4/928 |
| | | | | 420/451 |
| 7,670,582 | B2* | 3/2010 | Pak | H01M 4/8882 |
| | | | | 502/182 |
| 7,811,959 | B2* | 10/2010 | Lee | H01M 4/8605 |
| | | | | 502/185 |
| 7,867,941 | B2* | 1/2011 | Joo | C01B 32/00 |
| | | | | 502/174 |
| 8,129,306 | B2* | 3/2012 | Myers | B01J 23/8926 |
| | | | | 502/328 |
| 8,709,295 | B2 | 4/2014 | Zelenay et al. | |
| 9,017,837 | B2* | 4/2015 | Sun | H01M 8/1004 |
| | | | | 423/448 |
| 9,379,389 | B2* | 6/2016 | Jung | C01B 32/05 |
| 9,650,711 | B2* | 5/2017 | Chisholm | H01M 4/8867 |
| 9,694,346 | B2 | 7/2017 | Peng | |
| 9,711,802 | B2* | 7/2017 | Kim | H01M 4/921 |
| 9,755,247 | B2* | 9/2017 | Schüth | B01J 23/50 |
| 9,966,610 | B2* | 5/2018 | Hori | H01M 4/9083 |
| 10,038,199 | B2* | 7/2018 | Yang | B22F 1/142 |
| 10,195,590 | B2 | 2/2019 | Kallesøe et al. | |
| 10,384,193 | B2 | 8/2019 | Nguyen et al. | |
| 10,875,015 | B2 | 3/2020 | Zhou et al. | |
| 10,682,633 | B2* | 6/2020 | Pham-Huu | B01J 21/04 |
| 10,950,870 | B2* | 3/2021 | Kim | H01M 4/926 |
| 11,000,831 | B2* | 5/2021 | Chilukuri | B01J 37/04 |
| 11,018,349 | B2* | 5/2021 | Ahn | D01F 9/14 |
| 11,088,371 | B2* | 8/2021 | Fang | H01M 4/8657 |
| 11,121,390 | B2* | 9/2021 | Choi | B01J 37/12 |
| 11,258,072 | B2* | 2/2022 | Banham | H01M 4/881 |
| 2007/0160899 | A1 | 7/2007 | Atanassova et al. | |
| 2012/0258854 | A1* | 10/2012 | Kawamura | H01M 4/9083 |
| | | | | 977/773 |
| 2013/0133483 | A1 | 5/2013 | Yang et al. | |
| 2015/0231622 | A1* | 8/2015 | Kitagawa | B22F 9/24 |
| | | | | 502/152 |
| 2015/0255800 | A1* | 9/2015 | Feaver | H01M 4/463 |
| | | | | 429/405 |
| 2017/0104222 | A1* | 4/2017 | Ikehata | H01M 4/926 |
| 2017/0141405 | A1* | 5/2017 | Neumann | C01B 32/21 |
| 2018/0248199 | A1* | 8/2018 | Tsuda | B22F 1/054 |
| 2020/0358106 | A1* | 11/2020 | Birss | H01M 4/861 |

OTHER PUBLICATIONS

Seo, D., et al., "Nitrogen-doped carbon supported platinum catalyst via direct soft nitriding for high-performance polymer electrolyte membrane fuel cell", International Journal of Hydrogen Energy 43 (2018) 17873-17879.

Ning, X., et al., "Electronic Synergism of pyridinic- and graphitic-nitrogen on N-doped carbons for the oxygen reduction reaction", Chem. Sci. 10 (2019) 1589-1596.

* cited by examiner

FUEL CELL CATHODE CATALYST

TECHNICAL FIELD

The present disclosure generally relates to a fuel cell catalyst for oxygen reduction reactions composed of Pt—Ni—Cu nanoparticles supported on nitrogen-doped mesoporous carbon having enhanced activity and durability, and method of making said catalyst.

BACKGROUND

The background description provided herein is for the purpose of generally presenting the context of the disclosure.

Noble metals and their alloys have been widely explored for applications as catalysts in many chemical and electrochemical reactions. Metal and alloy nanoparticles are active catalysts which may be used in conjunction with a support material, such as carbon. The noble metals and their alloys are involved in catalysis. Therefore, the overall cost of catalysts can be largely related to the amount of precious metal incorporated therein.

SUMMARY

This section provides a general summary of the disclosure and is not a comprehensive disclosure of its full scope or all of its features.

In one aspect there is provided a catalyst comprising Pt—Cu—Ni alloy nanoparticles supported on nitrogen-doped mesoporous carbon. In one embodiment the Pt—Cu—Ni alloy nanoparticles have an octahedral or rhombic shape and a particle size from about 8-10 nm. In another embodiment, the Pt—Cu—Ni alloy nanoparticles supported on nitrogen-doped mesoporous carbon have enhanced ORR activity and durability.

In another aspect, there is provided a method for making a catalyst comprising platinum alloy nanoparticles supported on nitrogen-doped mesoporous carbon (MPC). The method comprises thermally pretreating a nitrogen-doped MPC support material to remove moisture and impregnating one or more metal precursors onto the obtained pre-treated nitrogen-doped MPC under vacuum condition. The precursor-impregnated N-MPC support material is heated to a functional temperature and a functional gas is delivered to the precursor-impregnated nitrogen-doped MPC support material, such that the one or more metal precursors reacting with the functional gas to form shaped platinum alloy nanoparticles supported on nitrogen-doped MPC.

In another embodiment the thermal pretreatment comprises heating the porous carbon material to a first temperature in air or in an atmosphere comprising Ar, $N_2$, $O_2$ or combinations thereof.

In another embodiment, the method further comprises evacuating the pretreated nitrogen-doped MPC support to further remove air from pores in the support prior to impregnation of the metal precursors.

In another embodiment, the functional gas is a gas mixture comprising $H_2$ and CO. In another embodiment, the functional gas is delivered at a partial pressure ratio of from 0:100 to 1:1 of $H_2$ to CO, and a volumetric flow rate of from 10 sccm to 1000 sccm. In another embodiment, the functional temperature is from 150° C. to 300° C. In yet another embodiment, the method further comprises maintaining the functional temperature for a period of from 0 hours to 5 hours in the presence of a functional gas.

In one embodiment the one or more metal precursors comprise platinum, nickel and copper. In another embodiment, the Pt—Cu—Ni alloy nanoparticles obtained by the aforementioned method have an octahedral or rhombic shape and a particle size from about 8-10 nm. In another embodiment, the Pt—Cu—Ni alloy nanoparticles supported on nitrogen-doped mesoporous carbon obtained by the aforementioned method have enhanced ORR activity and durability.

In another aspect, there is provided a method for forming platinum alloy particles into nitrogen-doped mesoporous carbon, which comprises: in a chamber, such as a furnace, removing moisture from a nitrogen-doped mesoporous carbon material, the nitrogen-doped mesoporous carbon having one or more pores; applying a vacuum to the chamber; delivering one or more precursors comprising platinum, nickel, and copper to obtain a precursor-impregnated nitrogen-doped mesoporous carbon material; purging the chamber using a purge gas; heating the precursor-impregnated nitrogen-doped mesoporous carbon material to a functional temperature; and delivering a functional gas to the precursor-impregnated nitrogen-doped mesoporous carbon material, the one or more precursors reacting with the functional gas to form shaped platinum alloy nanoparticles within the one or more pores of the nitrogen-doped mesoporous carbon material.

In one embodiment, applying the vacuum creates a pressure within the chamber of less than 500 millibars. In another embodiment the method comprises maintaining the vacuum during the purging of the chamber.

In another aspect, there is provided a method for oxygen reduction catalysis employing a catalyst which comprises Pt—Cu—Ni alloy nanoparticles supported on nitrogen-doped mesoporous carbon.

In yet another aspect, there is provided a fuel cell comprising a catalyst which comprises Pt—Cu—Ni alloy nanoparticles supported on nitrogen-doped mesoporous carbon.

Further areas of applicability and various methods of enhancing the above technology will become apparent from the description provided herein. The description and specific examples in this summary are intended for purposes of illustration only and are not intended to limit the scope of the present disclosure.

DRAWINGS

The present teachings will become more fully understood from the detailed description and the accompanying drawings wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DESCRIPTION

The present teachings provide noble metal alloy nanoparticles, such as platinum alloy nanoparticles as fuel cell catalyst materials. "Catalyst", as used herein, is a substance which alters the rate of a chemical reaction. Catalyst participate in a reaction in a cyclic fashion, such that the catalyst is not consumed by the reaction.

Octahedral Pt alloy catalysts represent a new frontier of advanced fuel cell catalyst materials as they have optimal surface facets for high activity. However, scale-up preparation of this type of catalysts with consistency in shape, size and composition control remains challenging.

Another major challenge with development of shape-controlled catalysts for fuel cell vehicle application is durability. One of the main causes for instability of the shape-controlled Pt alloy is the sharp edge of the nanoparticles that results in an easy detachment of the particles from a carbon support during electrochemical cycling.

The present invention relates to octahedral Pt—Cu—Ni alloy nanoparticles supported on nitrogen-doped mesoporous carbon for oxygen reduction catalysis which have improved ORR activity and durability. The octahedral Pt—Cu—Ni alloy nanoparticles are made by a solid state method which increases the scale of catalyst synthesis 10 to 100 times without the use of surfactants. Additionally, the Pt—Cu—Ni alloy nanoparticles of the present invention are incorporated into a nitrogen-doped mesoporous carbon (MPC) support via a vacuum impregnation method, which prevents nanoparticle migration and helps to enhance durability. Although the active sites of nitrogen-doped carbon materials are unclear, it is believed that the carbon atoms adjacent to pyridinic nitrogen (some literature suggests both pyridinic and graphitic nitrogen) may play a key part in promoting ORR, which may be synergistic to the Pt catalysts. In addition, nitrogen-doped carbon shows more oxidation resistance. The nitrogen functional groups on the surface of the carbon enhance the strength of the bond with the Pt nanoparticles, which helps prevent coalescence and agglomeration, thus enhancing durability of the catalyst.

In one embodiment there is provided a catalyst comprising Pt—Cu—Ni alloy nanoparticles supported on nitrogen-doped mesoporous carbon. The Pt—Cu—Ni alloy nanoparticles have an octahedral or rhombic shape and a particle size from about 8-10 nm. In another embodiment, the Pt—Cu—Ni alloy nanoparticles supported on nitrogen-doped mesoporous carbon have enhanced ORR activity and durability.

Embodiments described herein relate to a method for forming metal alloy nanoparticles, such as octahedral platinum-copper-nickel (PtCuNi) nanoparticles, into a nitrogen-doped MPC support material. The methods described herein can further be applied to forming a variety of other types of nanoparticles into a variety of porous structures.

Exemplary embodiments include removing moisture from the nitrogen-doped MPC support material. Removing moisture from the nitrogen-doped MPC support material can be performed within a chamber. The chamber may be capable of removing moisture from the porous material. The chamber may be a furnace, a dessicator, a vacuum chamber, or others capable of removing moisture. The porous material can be held in the chamber in air or an atmosphere which can include argon (Ar), nitrogen ($N_2$), oxygen ($O_2$), carbon dioxide ($CO_2$), other atmosphere gases, other inert gases, or combinations thereof. In an exemplary embodiment, air is used to remove moisture from the porous material.

In one embodiment, the nitrogen-doped MPC support material may be thermally pretreated to remove moisture at a pretreatment temperature selected such that the porous material can be substantially dry within the desired time frame, without damaging the porous material. In an exemplary embodiment the pretreatment temperature may be in the range of about 100° C. to about 300° C. In one embodiment, the pretreatment temperature is about 300° C. The thermal pretreatment time frame may be long enough to substantially remove moisture from the porous carbon material. In one embodiment the thermal pretreatment time frame may be in the range of from about 1 hr to about 24 hours. The pretreatment time frame can be longer or shorter, as suited to the pretreatment temperature and the moisture of the porous carbon material. As used herein, the term "substantially" includes exactly the term it modifies and slight variations therefrom. Thus, the term "substantially remove" means exactly remove and slight variations therefrom.

Embodiments disclosed herein may include impregnation of metal precursors onto the nitrogen-doped mesoporous material under vacuum condition, or vacuum impregnation. "Vacuum impregnation", as used herein, refers to impregnating the porous material (e.g., the porous carbon material) using the metal precursors while under vacuum condition. Vacuum impregnation can provide the benefit of effectively loading the metal precursors inherent in microporous or mesoporous structures. Embodiments herein can further include reducing the impregnated metal precursors into shaped alloy nanoparticles using a reducing gas atmosphere. The reduction in situ of the metal precursors can allow the nanoparticles to form and embed in the walls of the porous structure, reducing the nanoparticle migration post-synthesis.

A vacuum may be applied to a chamber. The vacuum can be delivered to the chamber using a vacuum supply source, such as a pump fluidly connected to the chamber. The vacuum supply source can reduce the atmospheric pressure within the chamber to a pressure which is in a range of less than about one (1) bar, such as a range of less than about 500 millibars. In one embodiment, the pressure within the chamber can be in the range of 500 millibars to about 0.1 millibar. In one embodiment, the temperature of the chamber can be in a range of from about 20° C. to about 100° C. The vacuum can be maintained or recreated during one or more steps of the method described herein. The vacuum applied between steps can vary, such as within the ranges described herein, in a continuous or non-continuous fashion.

In one embodiment, impregnation of the metal precursors on the nitrogen-doped MPC support material may be achieved by the addition of a precursor solution to the porous substrate under vacuum condition, i.e., vacuum impregnation, for uniform distribution of the metal precursors into the pores of the substrate. The metal precursors can be dissolved into a solvent to create the precursor solution. The precursor solution can be used to impregnate the metal precursors onto the porous material. "Solvent" refers to a substance which dissolves or suspends reactants (e.g., metal precursors) and provides a medium in which a reaction may occur. Examples of solvents that may be suitable include, but are not limited to water, ethanol, acetone, acetonitrile, acetylacetone (acac), dimethylformamide, methanol, propanol, hexane, toluene, chloroform, dimethyl ether, tetrahydrofuran, dimethyl sulfoxide, and mixtures thereof. In one exemplary embodiment, the solvent may be chloroform. Suitable solvents will be apparent based on the chosen metal precursors. Solvents used herein can have limited or no reaction with either the metal precursors or the porous material. Further, the solvents can help to disperse the metal precursors onto the porous carbon materials.

The precursor solution can include one or more metal precursors. The metal precursors may be first dissolved in a solvent before vacuum impregnation onto support materials. The solvent and vacuum impregnation can result in uniform distribution of metal precursor molecules into the porous carbon materials. The metal precursors can be selected in light of the desired components such as platinum, copper, palladium, nickel, or others. In an exemplary embodiment, the metal precursors include platinum, copper and nickel. The precursor solution can be delivered as components or mixed, where the metal precursor is dissolved in a solvent, such as chloroform, acetone, toluene. In one example, the precursor solution may include platinum (II) acetylacetonate, ($Pt(acac)_2$), copper (II) acetylacetonate, ($Cu(acac)_2$), and nickel (II) acetylacetonate, ($Ni(acac)_2$) dissolved in a volatile solvent, such as chloroform.

The precursor solution is added to the porous material to distribute the metal precursor into the porous material. The precursor solution can be delivered at a controlled speed and in the presence of agitation (e.g., vigorous stirring). The porous carbon and catalyst mixture can be maintained under vacuum and/or continuous stirring for a suitable period of time to ensure absorption and adsorption of the precursor solution into the porous material. The vacuum reduces pressure, allowing for better surface wetting of the porous material, evacuation of volatile chemicals and more importantly the impregnation of the precursors into the pores of the porous material. The vacuum pulls out the air in the pores of the porous materials and creates a dry low-pressure atmosphere allowing the precursors to be impregnated into the pores. The continuing vacuuming dries the saturated porous material, which includes the porous material and the metal precursor adsorbed thereon and/or absorbed therein.

After mixing and drying the saturated porous material under the vacuum condition, the saturated porous material is transferred to a furnace, being purged using a purge gas. The purge gas may be delivered to clear the furnace. The purge gas can include an inert gas. The inert gas can be a gas that is not reactive with the surfaces of the chamber, the porous substrate, and the precursor solutions. The inert gases can include, but are not limited to, noble gases, such as Ar, He, Xe, and the like, or non-reactive gases, such as $N_2$. In one exemplary embodiment, the purge gas is $N_2$. The inert gas may be supplied to the furnace at a flow rate of from about one (1) sccm to about 1000 sccm. The end point can be determined based on clearance from the furnace of air, specific time frame, or others as desired.

The porous material can be heated to a functional temperature. The reducing of the reactants can include heating the saturated porous material at the designated ramping rate to a functional temperature. The furnace can be heated to functional temperature. The functional temperature can be a temperature at which the metal precursor reaction can occur. In one embodiment, the functional temperature can be in a range of from about 150° C. to about 300° C. In one exemplary embodiment, the functional temperature is about 200° C. The designated ramping rate can be a ramping rate which achieves the desired reaction, including the morphology of the resulting particles, without damaging the porous material or the metal precursors. In one embodiment, the designated ramping rate can be a range from about 1° C./min to about 20° C./min. In one exemplary embodiment, the ramping rate is 15° C./min. The functional temperature can be maintained in the furnace for the functional time frame, based at least on the desire, the metal precursor being reduced, specific particle shape and size, or others. In one embodiment, the functional time frame can be a range from about zero (0) hours to about five (5) hours for metal precursor reduction.

Before, during, or after the heating to the functional temperature, a functional gas can be delivered to the porous material. The reactants on the porous material can then be reduced in the one or more functional gases. In one embodiment, the designated temperature can be maintained for the designated reaction time. During this process, the functional gases facilitate the transportation of metal precursors to their growing sites and the reduction of the metal precursors into their respective metal or alloys as the case may be based on the precursors employed.

The functional gases preferentially adsorb to certain surfaces of growing metal and alloy nanoparticles, altering the surface plane growth rate and confining their growth into particular morphologies. For instance, if the functional gases adsorb preferentially to the (100) planes, then the grown particles have a cubic morphology. If the functional gases adsorb preferentially to the (111) planes, the grown particles have either a tetrahedral or an octahedral (i.e., rhombic) morphology. The many different synthetic parameters, including the type of functional gas atmosphere, the total pressure/partial pressure of the gases, the ramping rate for heating the materials, the reduction temperature, and the reduction time can influence the reduction rate of the metal precursors and the nucleation rate of the reduced metals. These influences consequently affect the growth rate of metal alloy nanoparticles and thus their final particle size.

Functional gases, such as CO, $H_2$, $NH_3$, NO, and $C_2H_2$, can be used. The functional gases they have preferential adsorption to metal planes which can be used to control the shape of the metal precursors. The functional gas atmosphere can be a pure gas, such as one listed above, or it can also be a mixture of one of those gases with hydrogen and/or inert gases. If multiple gases are used, partial pressures of each gas can be adjusted individually, or the total pressure of all the gases can be adjusted. The method described here be carried out using only functional gases. Functional gases can be easily removed from the produced materials once the process is complete.

In one embodiment, both CO and $H_2$ gases are used for the functional gases. CO and $H_2$ gases can be applied differentially to control the final morphology of the metal alloy nanoparticles. In one example, CO and $H_2$ gases can be used, in varying concentrations, to reduce the noble metal platinum. In one embodiment, a gas mixture of $H_2$ and CO can be delivered at a partial pressure ratio being in range of 0:100 (e.g., zero (0) parts $H_2$ to 100 parts CO). In another embodiment, a gas mixture of $H_2$ and CO can be delivered at a partial pressure ratio being in range of greater than 1:100 (e.g., one (1) part $H_2$ to 100 parts CO) $H_2$ to CO gas, such as a range of greater than 1:50 $H_2$ to CO gas, where greater refers to increasing concentrations of $H_2$ as compared to CO gas. In another embodiment, a gas mixture of $H_2$ and CO can be delivered at partial pressure ratio being in the range of from about 1:100 (i.e., one (1) part $H_2$ to 100 parts CO) to about 1:1 of $H_2$ to CO gas. The functional gases can be delivered at a volumetric flow rate in a range of from about ten (10) sccm to about 1000 sccm, such as in a range of from about 100 sccm to about 500 sccm. The flow rate, in sccm, of the functional gases can be based on the current temperature of the chamber or room temperature. The functional gas can further include a carrier gas. The carrier gas can be an inert gas, as described above, such that flow rate can be maintained while limiting the available reactants for reducing the metal precursors.

CO and $H_2$ gases can be used together to control platinum nanoparticle size and morphology as desired, for porous materials described herein. In one or more embodiments, the parameters described above can be applied to produce platinum alloy nanoparticles, such as octahedral or rhombic platinum alloy nanoparticles. In one example, the octahedral or rhombic platinum alloy nanoparticles are octahedral PtCuNi nanoparticles having a particle size of about 8-10 nm. The precursors can react with the functional gas to produce octahedral platinum alloy nanoparticles within the pores of the nitrogen-doped MPC material.

Examples

Various aspects of the present disclosure are further illustrated with respect to the following examples. It is to be understood that these examples are provided to illustrate specific embodiments of the present disclosure and should not be construed as limiting the scope of the present disclosure in or to any particular aspect.

Synthesis

Materials Synthesis

Octahedral Pt—Cu—Ni/N-doped MPC samples were prepared using a scalable, surfactant-free, and facile innovative solid state chemistry method, which involved impregnation of metal precursors on a carbon support and reducing them in a stream of CO and $H_2$ gas mixture. As for the specific procedure, the nitrogen-doped (4 at %) mesoporous carbon was thermally treated in air at 300° C. overnight for removing moisture prior to use. The material was then added into one flask connected with Schlenk line. The system was evacuated to remove the air in the support pores. The precursor solution ($Pt(acac)_2$, $Ni(acac)_2$ and $Cu(acac)_2$ dissolved in chloroform) was injected to the support material under the vacuum condition and vigorous stirring. The support material rapidly absorbed the precursor solution, suggesting effective impregnation of the precursors into the support pores. After the impregnation, the mixture was immediately transferred to a furnace which was then purged by $N_2$ flow for 20 minutes. The mixtures were reduced by being heated at a ramping rate of 15° C./min to 200° C. and maintaining at the temperature for 1 hour in $H_2$/CO (5/120 $cm^3$/min). The gas atmosphere was switched back to $N_2$ and the product was cooled down to room temperature after the reaction was complete. The samples were then collected.

Ink Preparation

Catalyst ink was prepared by bath sonicating (with ice) sample powders with DI water, iso-propanol (IPA), and Nafion ionomer (Nafion D520) for one hour. The ink recipe is: IPA/water=1/3 (volume); I/C=0.5 (weight), Pt loading 7.5 $\mu g/cm^2$.

RDE Coating

A glassy carbon electrode (5 mm in diameter) was polished and rinsed to make sure the surface is clean before coating. 10 µL fresh ink was transferred onto the glassy carbon electrode. The electrode was mounted to a rotator (Pine Instrument rotator upside down) and was rotated at a speed of 700 rpm and dried.

Characterization

Figure 1:
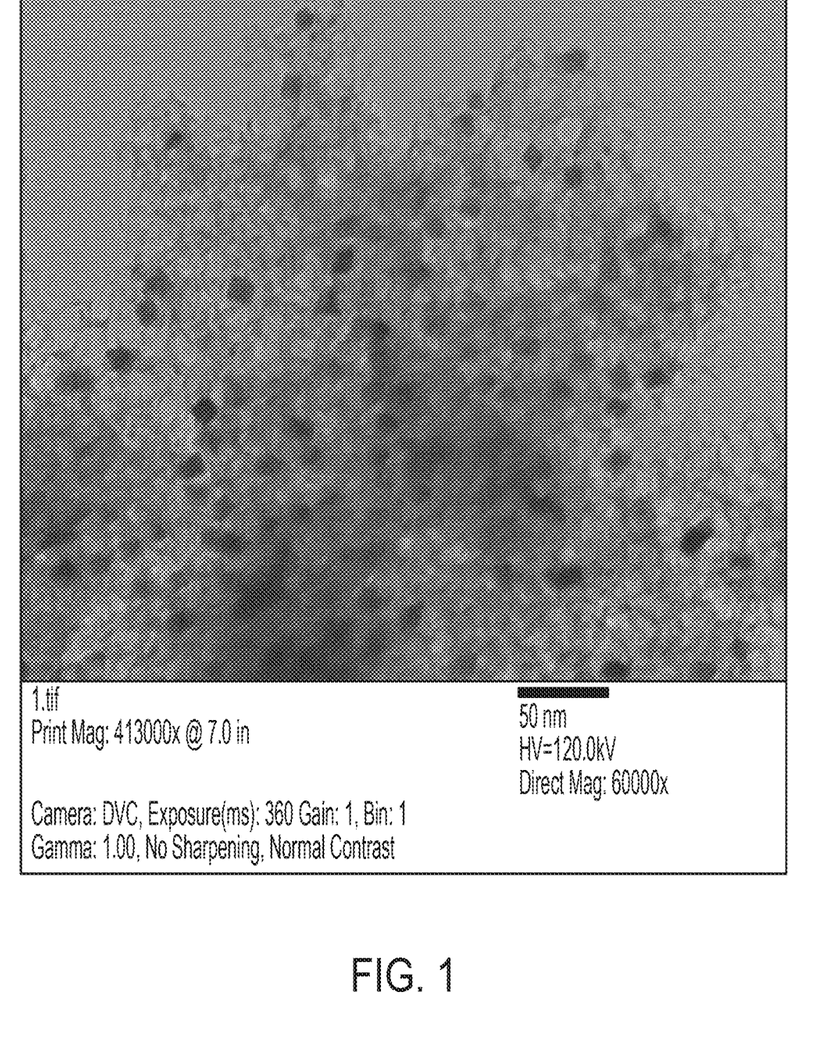
FIG. 1 is a Transmission Electron Microscopy (TEM) image of PtCuNi nanoparticles supported on nitrogen-doped mesoporous carbon.

The morphology of the PtCuNi/N-doped MPC materials synthesized is shown in FIG. 1. Nanoparticles are well sited in the pores of the mesoporous carbon. Most of the particles are seen in a rhombic shape-octahedral structure with fairly uniform nanoparticle sizes of around 8-10 nm.

Figure 2A:
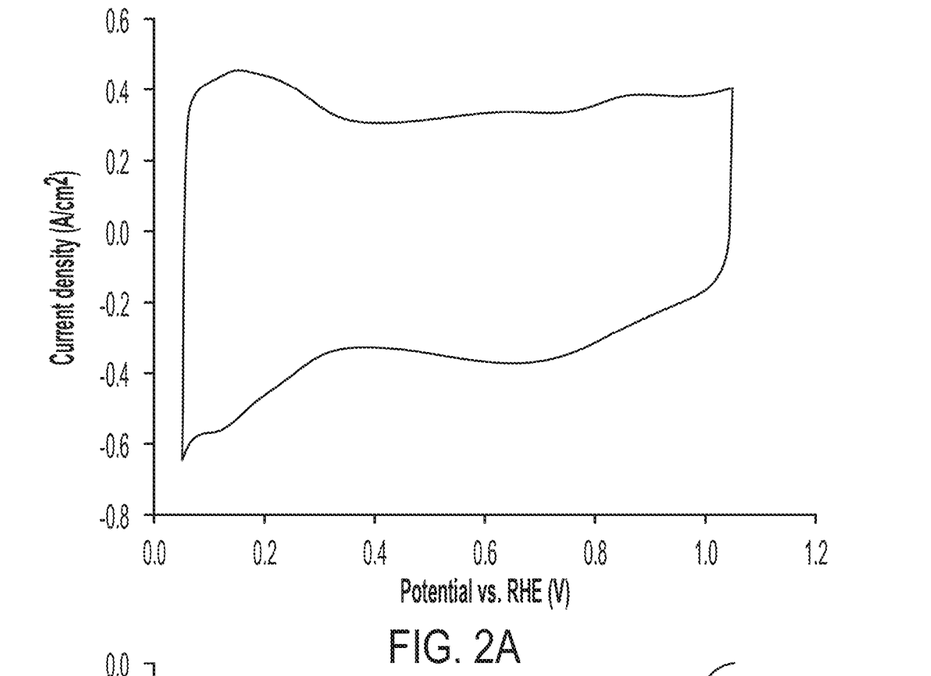
FIGS. 2A, 2B and 2C show the electrochemical characterization of octahedral PtCuNi/N-doped MPC.
Figure 2B:
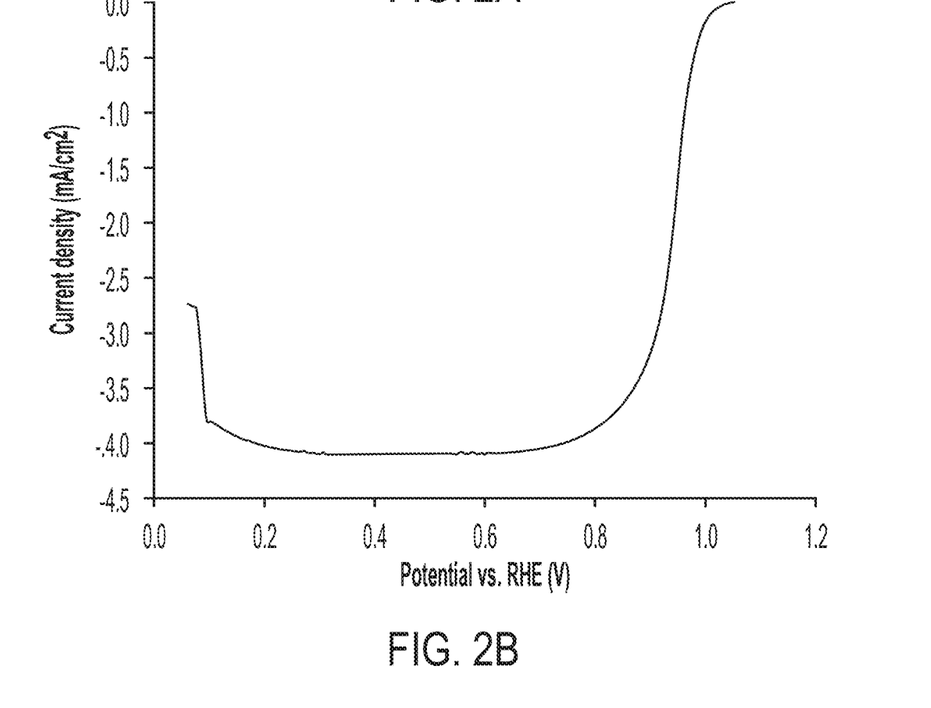
Figure 2C:
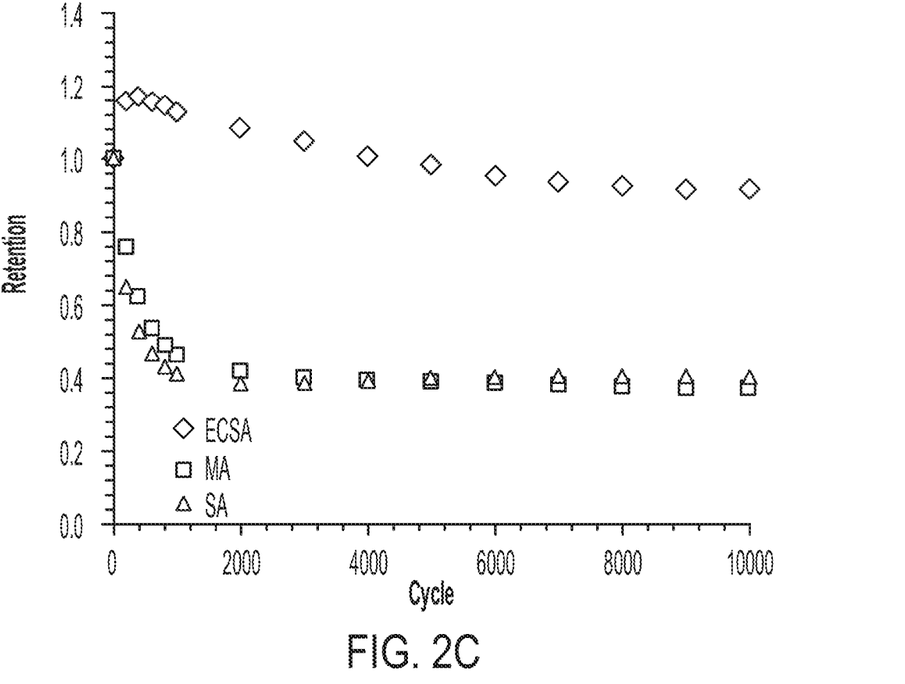

Electrochemical evaluations on PtCuNi/N-doped MPC are shown in FIG. 2. FIG. 2A shows cyclic voltammetry (CV). FIG. 2B shows linear sweep voltammetry (LSV) and FIG. 2C shows retention of electrochemical surface area (ECSA), specific activity (SA) and mass activity (MA) against durability cycles. The ECSA and mass activity (MA) (at 0.9 V vs. RHE) were estimated to be ~42 $m^2$/gPt and ~1860 A/gPt, respectively. MA retained 37% of its initial mass activity after 10 k cycles.

Figure 3A:
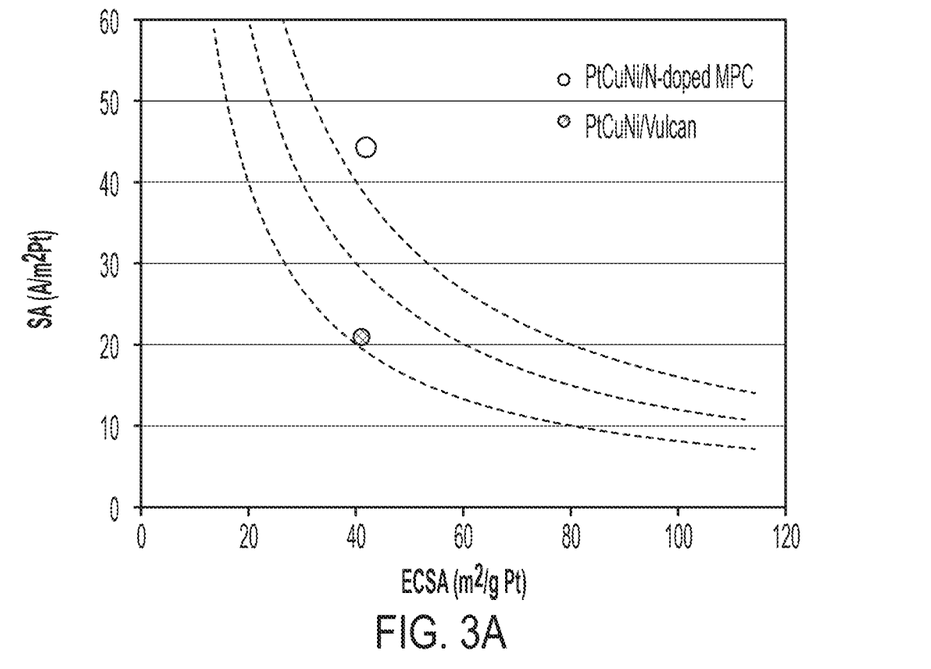
FIGS. 3A and 3B show a comparison of the ORR activity and durability for the catalyst of PtCuNi nanoparticles supported on nitrogen-doped MPC and the same PtCuNi nanoparticles supported on a Vulcan XC 72 solid carbon support.
Figure 3B:
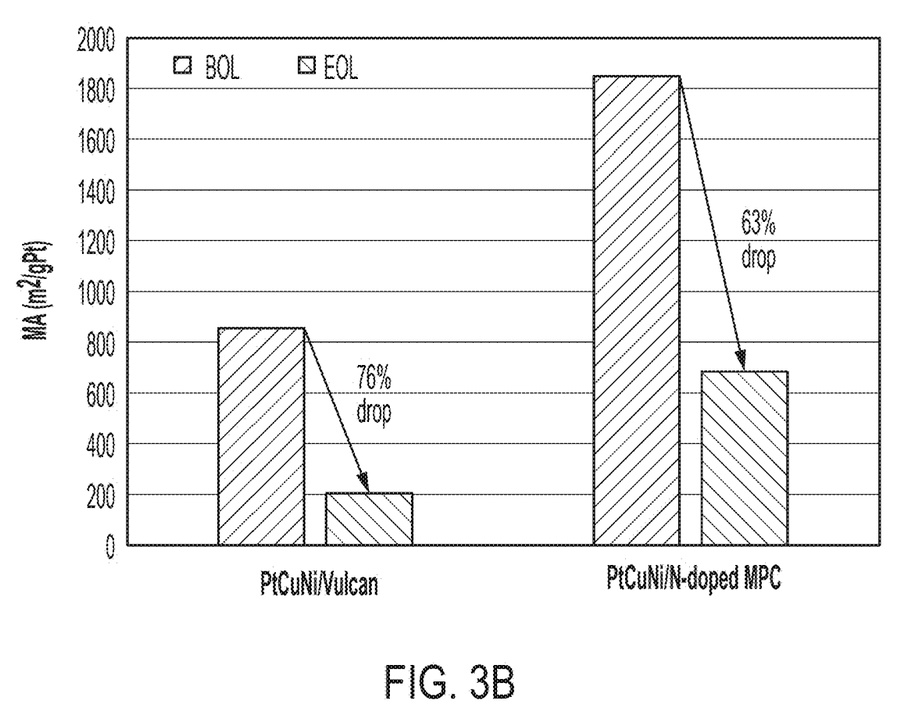

The ORR activity and durability results for the catalyst of PtCuNi supported on nitrogen-doped MPC are compared to the same PtCuNi nanoparticles supported on Vulcan XC 72 solid carbon (FIG. 3). FIG. 3A shows the ECSA and SA of the catalyst of PtCuNi nanoparticles supported on nitrogen-doped MPC and the same PtCuNi nanoparticles supported on a Vulcan XC 72 solid carbon support. FIG. 3B shows the beginning of life (BOL) and end of life (EOL) mass activity of the catalyst of PtCuNi nanoparticles supported on nitrogen-doped MPC and the same PtCuNi nanoparticles supported on a Vulcan XC 72 solid carbon support. PtCuNi/N-doped MPC exhibited much higher activity and improved durability than PtCuNi/Vulcan.

Performance Evaluation

Electrochemical Test

The electrochemical experiments were conducted using a Pine Instrument RDE workstation. A three-electrode system, consisting of the catalyst film-coated glassy carbon working electrode, a platinum wire counter electrode, and a homemade Pt reference electrode (with fresh $H_2$ from water electrolysis for each test), were used for all electrochemical measurements.

The electrolyte used was 0.1 M $HClO_4$ which was freshly prepared before the test.

The BOL (beginning of life) test procedure was as follows:

(1) Flow $O_2$ (30 minutes) to saturate electrolyte.

(2) Cyclic voltammetry (CV)-conditioning/activation: 0.05-1.05 V, 100 mV/s, until yielding stable activity (no further increase in the current at 0.9V vs. RHE, usually 30-50 cycles).

(3) Linear sweep voltammetry (LSV): 0.05-1.05 V, 10 mV/s, electrode rotation rate of 900 rpm. 4 cycles of CV (0.04-1.05 V, 100 mV/s) before collecting LSV data.

(4) Flow Ar (30 minutes) to saturate electrolyte.

(5) CV: 4 cycles of CV, 0.05-1.05 V, 50 mV/s. The 3rd cycle was used to calculated the electrochemical active surface area (ECSA). The ECSA was calculated by integrating the area in hydrogen adsorption range (0.065-0.40 V).

Durability test protocol: square wave 1.0V (3 s)-0.4V (3 s), 10 k cycles, 0 rpm, 25° C., $O_2$ saturated 0.1 M $HClO_4$. The CV (to calculate ECSA) and LSV (to calculate ORR activity) were collected periodically during durability test.

Catalyst materials in accordance with embodiments of the present disclosure may be used to catalyze an oxygen reduction reaction (ORR), an oxygen evolution reaction (OER), formic acid oxidation reaction (FAOR), methanol oxidation reaction (MOR), ethanol oxidation reaction (EOR), and the like. For example, the catalyst material of the present invention can be used in a fuel cell (e.g., hydrogen proton exchange membrane fuel cells (PEMFCs), direct formic acid fuel cells, direct methanol fuel cells (DMFCs), direct ethanol fuel cells and the like) or metal-air battery.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple embodiments having stated features is not intended to exclude other embodiments having additional features, or other embodiments incorporating different combinations of the stated features.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, Where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A method of making a catalyst comprising platinum alloy nanoparticles supported on nitrogen-doped mesoporous carbon (MPC), said method comprising:

thermally pretreating a nitrogen-doped MPC support material to remove moisture;

evacuating the pretreated nitrogen-doped MPC support to further remove air from pores in the support;

impregnating metal precursors comprising platinum, nickel, and copper onto the pretreated nitrogen-doped MPC under vacuum condition to obtain a precursor-impregnated nitrogen-doped MPC support material;

heating the precursor-impregnated nitrogen-doped MPC support material to a functional temperature in the range of from 150° C. to 300° C.; and delivering a functional gas comprising a gas mixture which comprises $H_2$ and CO to the precursor-impregnated nitrogen-doped MPC support material, the metal precursors reacting with the functional gas to form shaped platinum alloy nanoparticles supported on nitrogen-doped MPC.

2. The method according to claim 1, wherein thermally pretreating comprises heating the mesoporous carbon material to a first temperature in an atmosphere comprising air, Ar, $N_2$, $O_2$ or combinations thereof.

3. The method according to claim 1, wherein the thermally pretreating comprises heating the mesoporous carbon material in air.

4. The method according to claim 1, comprising delivering the functional gas at a partial pressure ratio of from 0:100 to 1:1 of $H_2$ to CO, and a volumetric flow rate of from 10 sccm to 1000 sccm.

5. The method according to claim 1, further comprising maintaining the functional temperature for a period of from 0 hours to 5 hours in the presence of a functional gas.

6. The method according to claim 1, wherein said nanoparticles have an octahedral or rhombic shape and a particle size from about 8-10 nm.

7. The method according to claim 1, wherein the catalyst comprising platinum alloy nanoparticles supported on a nitrogen-doped mesoporous carbon material has enhanced ORR activity and durability.

8. A method for forming platinum alloy particles into nitrogen-doped mesoporous carbon, comprising:

in a chamber removing moisture from a nitrogen-doped mesoporous carbon material, the nitrogen-doped mesoporous carbon material having one or more pores;

evacuating the nitrogen-doped mesoporous carbon material to further remove air from the pores applying a vacuum to the chamber;

delivering precursors comprising platinum, nickel, and copper to obtain a precursor-impregnated nitrogen-doped mesoporous carbon material;

purging the chamber using a purge gas;

heating the precursor-impregnated nitrogen-doped mesoporous carbon material to a functional temperature in the range of from 150° C. to 300° C.; and delivering a functional gas comprising a gas mixture which comprises $H_2$ and CO to the precursor-impregnated nitrogen-doped mesoporous carbon material, the precursors reacting with the functional gas to form shaped platinum alloy nanoparticles within the one or more pores of the nitrogen-doped mesoporous carbon material.

9. The method according to claim 8, wherein heating of the precursor-impregnated nitrogen-doped mesoporous carbon material is at a ramping rate of 15° C./min. to 200° C.

10. The method according to claim 9, further comprising maintaining at 200° C. for 1 hour in $H_2$/CO (5/120 $cm^3$/min).

* * * * *